Sept. 6, 1955  G. LERNER  2,716,814
COMBINED BUTTER DISH AND SLICER
Filed Oct. 6, 1953
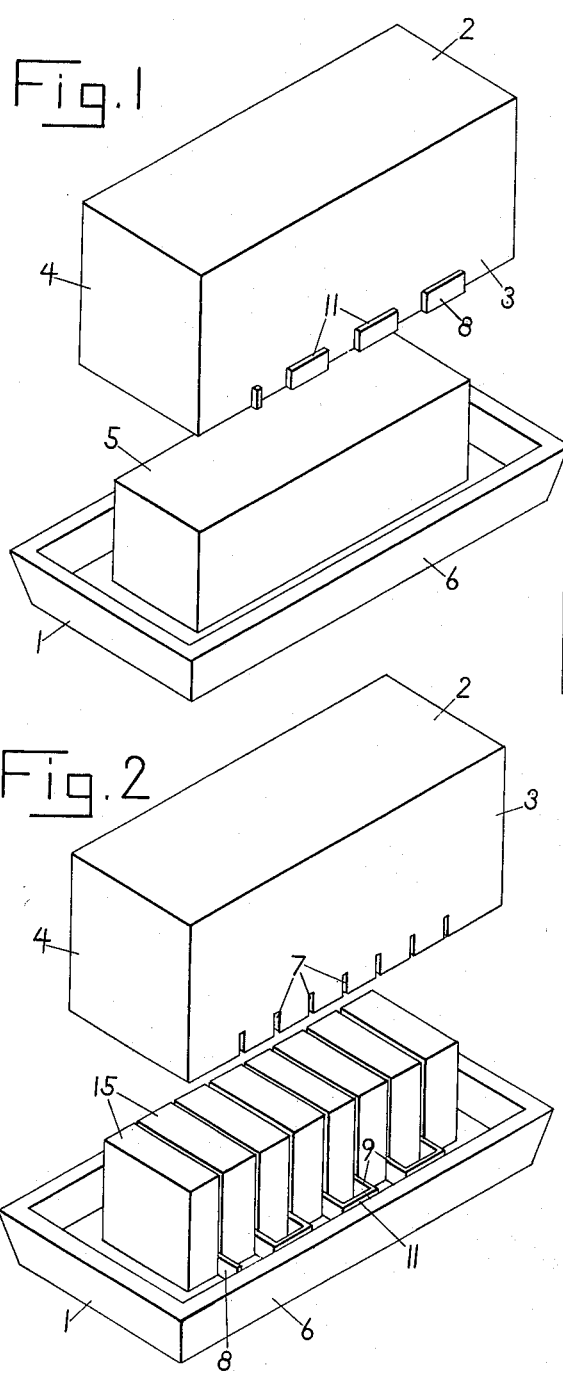
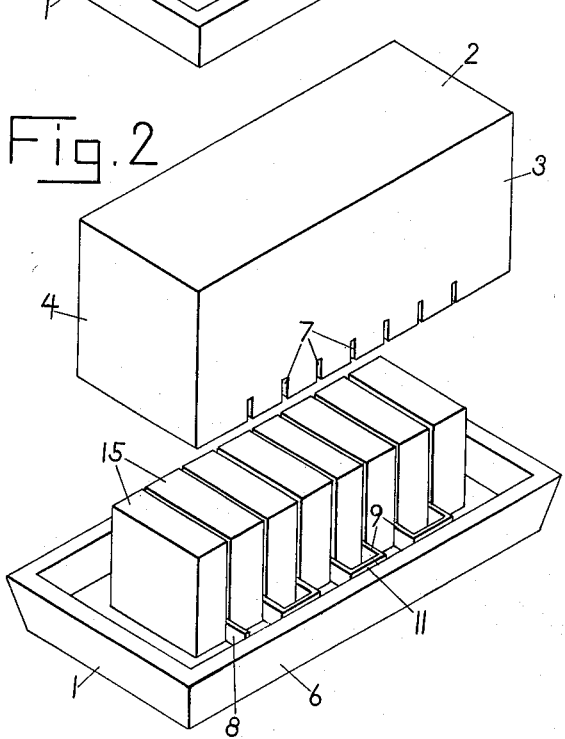
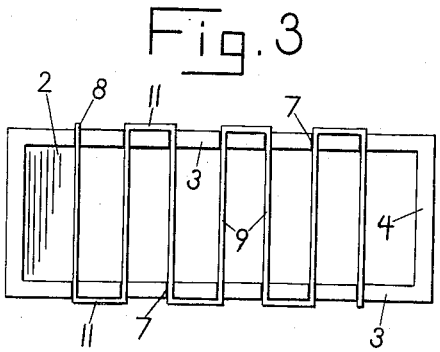
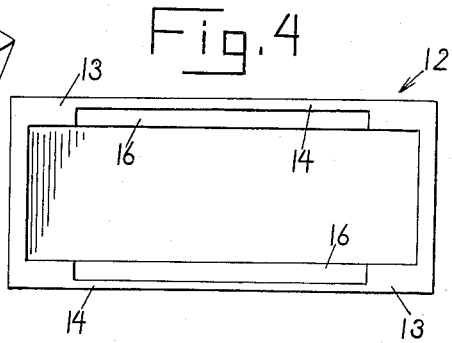
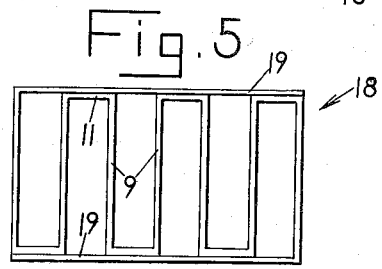
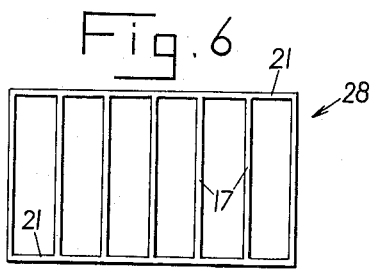
INVENTOR:
GEORGE LERNER
BY Maurice Bloch
ATTORNEY

United States Patent Office 2,716,814
Patented Sept. 6, 1955

2,716,814

COMBINED BUTTER DISH AND SLICER

George Lerner, Freeport, N. Y.

Application October 6, 1953, Serial No. 384,424

5 Claims. (Cl. 31—22)

My invention relates to devices for slicing pieces of butter into pats, and one of its objects is to incorporate a slicer in a butter dish.

Other objects are to use the cover of a butter dish as a handle for the slicer and simultaneously as a protection of the pats being cut against lateral deformation and against toppling, and thereby to reduce the number of parts, the expenses and the storage space required when butter is to be stored and sliced.

Further objects are to secure a slicer to the cover of a butter dish removably, to lift the cover after the butter has been cut into pats without lifting the slicer whereby the slicer will remain on the plate of the butter dish in a position in which the slicer keeps the pats in separated condition, and thereby to prevent reunion of the pats.

Still other objects are to attain these results with simple means, to adapt the cover for the attachment of the slicer by providing suitable grooves in its lower surface, thereby to make possible the use of a butter dish of conventional and convenient shape, and to make the slicer simply of one thin strip of suitable material.

Still other objects and advantages will appear from the following description of exemplifying embodiments of my invention, from the appended claims and from the accompanying drawing in which:

Fig. 1 shows a perspective view of an illustrative embodiment of my invention and of an unsliced piece of butter, the slicer and cover being positioned for the start of the slicing operation.

Fig. 2 shows a perspective view of the parts shown in Fig. 1 after the butter has been sliced and the cover has been lifted again.

Fig. 3 shows a bottom view of the cover and slicer shown in Fig. 1.

Fig. 4 shows a bottom view of a modified cover represented without slicer.

Figs. 5 and 6 show bottom views of different modifications of the slicer.

Referring to Figs. 1 to 3, numeral 1 indicates the plate and 2 the cover of a butter dish. This dish may have the usual shape, except for the grooves or recesses of the cover which will be described later. The cover has longer side walls 3 and shorter side walls 4 surrounding a space which is elongated, of substantially rectangular cross-section and slightly larger than the space occupied by a piece of butter 5 of standard size and shape. In closed condition of the dish, the lower surface of the cover side walls contact the upper surface of the plate at a little distance from the plate side walls 6.

According to my invention, the longitudinal walls 3 of the cover have grooves 7 in their lower surfaces. The grooves 7 have a uniform depth equal to the height of the slicer which will be described later, and cross the walls 3 perpendicularly. The grooves of one wall 3 are juxtaposed to the grooves of the opposite wall 3.

A slicer 8 is made of a thin strip of suitable material, for example, of stainless steel or of plastic. The thickness of the strip forming the slicer is exaggerated in the drawing for the sake of clear representation and is only a small fraction of the height of the strip. This strip is bent or molded to form a preferably rectangularly cornered zig-zag line comprising a number of parallel longer portions 9 and shorter portions 11, each connecting the end of two portions 9. For slicing, the ends of the portions 9 are inserted in the grooves 7, the remaining parts of the portions 9 crossing the interior of the cover 2, and the portions 11 extending along the outside of the walls 3.

The distances between the individual portions 9 are measured according to the thicknesses of the pats to be cut, and may be equal for cutting pats of uniform thickness or may be different for cutting pats of different thickness. The distance between the portions 11 is preferably equal to or only slightly larger than the width of the cover 2. The inserted portions of the slicer 8 fit the grooves in such a manner that the slicer can be easily inserted from the lower side and can be easily taken out in reverse direction. In the lifted position of the cover shown in Fig. 1, the inserted slicer adheres to the cover loosely.

In order to slice the piece of butter the cover is moved down from the position shown in Fig. 1 until the cover and the slicer contact the plate 1 whereby the portions 9 of the slicer cut the butter piece 5 into pats 15 while the cover protects the butter from contact with the hand and prevents substantial deformation of the outer shape of the butter piece even if the butter is relatively soft.

The cover may stay on the plate in protective position until it is desired to take one or several pats 15 out of the dish. When the cover is lifted, the slicer is preferably left on the plate as shown in Fig. 2. In this position, the slicer prevents re-union and deformation of the pats without hindering the removal of individual pats.

The cover 12 of which Fig. 4 shows a bottom view may be used instead of the cover 2 and differs from the latter by a broader lower surface and by the shape of the grooves in this surface. The cover 12 has straight grooves 16 and longitudinal side walls 13 which have thinner portions 14 separating the grooves 16 from the outside. These grooves have a length equal to the length of the slicer and have a height equal to the height of the slicer. They are entirely open toward the bottom and toward the interior of the cover and, hence, form recesses in the lower inner edges of the cover or of its walls 13.

The slicer 8 fits the rectangular space defined by the two grooves 16. When inserted in this space, the slicer is not visible from the outside and may be used in the same manner as described before.

A slicer 18 of a type illustrated by Fig. 5 or a slicer 28 of a type illustrated by Fig. 6 may be used instead of the slicer 8 in combination either with the cover 2 or with the cover 12. The slicer 18 is preferably made of one strip of metal and is identical to the slicer 8, except that the ends of the strip forming the slicer have extensions 19 which are bent into contact with the portions 11 and may be affixed to these portions in any suitable manner, for example by point welding.

The slicer 28 is preferably made of plastic material and molded in one piece. This slicer has the same height, length and width as the slicer 18 and has slicing portions 17 corresponding to the portions 9 of the slicers 8 and 18 and extending between longitudinal portions 21 connecting the ends of the portions 17.

I desire it understood that my invention is not confined to the particular embodiments shown and described, the same being merely illustrative, and that my invention may be carried out in other ways within the scope of the appended claims without departing from the spirit of my invention as it is obvious that the particular embodiments shown and described are only a few of the many that may be employed to attain the objects of my invention.

Having described the nature of my invention, what I claim and desire to protect by Letters Patent is:

1. A combined butter dish and slicer comprising a butter dish having a cover having two opposite side walls with bottom surfaces provided with grooves opening toward the interior of said cover, and a slicer forming a zigzag-like strip having portions fittingly inserted in said grooves, being slidable in the same and removable therefrom in downward direction, said slicer having other portions connecting said inserted portions and extending across the interior of said cover.

2. A combined butter dish and slicer comprising a butter dish having a cover having two opposite side walls with bottom surfaces provided with grooves opening toward the interior of said cover, and a slicer forming a zigzag-like strip made of horizontally thin and vertically broad and stiff material, having portions fittingly and downward removably inserted in said grooves and having portions connecting said inserted portions and extending across the interior of said cover.

3. A combined butter dish and slicer comprising a butter dish having a cover having two opposite side walls with bottom surfaces provided with grooves opening toward the interior of said cover, and a slicer forming a zigzag-like strip having U-shaped portions fittingly inserted in said grooves, being slidable in the same and removable therefrom in downward direction, said slicer having other portions connecting said inserted portions and extending across the interior of said cover.

4. A combined butter dish and slicer comprising a butter dish having a cover having two opposite side walls provided with recesses extending along and in the inner lower edges of said walls, and a slicer having lateral portions fittingly inserted in said recesses, being slidable in the same and removable therefrom in downward direction, said slicer having other portions forming thin-walled strips extending across the interior of said cover.

5. A combined butter dish and slicer comprising a butter dish having a cover having two opposite side walls provided with recesses extending along and in the inner lower edges of said walls, and a slicer made of thin strips molded in one piece, having portions fittingly and downward removably inserted in said recesses, being slidable in the same and removable therefrom in downward direction, said slicer having other portions extending across the interior of said cover.

References Cited in the file of this patent

UNITED STATES PATENTS

| | | |
|---|---|---|
| 893,591 | Larsen | July 14, 1908 |
| 1,045,988 | Larsen | Dec. 3, 1912 |
| 1,132,378 | Patterson | Mar. 16, 1915 |
| 2,111,035 | Winslow | Mar. 15, 1938 |
| 2,349,078 | Crowley et al. | May 16, 1944 |
| 2,645,852 | Weinberg | July 21, 1953 |

FOREIGN PATENTS

| | | |
|---|---|---|
| 5,650 | Great Britain | Nov. 30, 1895 |
| 621,889 | France | Feb. 14, 1927 |